United States Patent
Prieditis

(10) Patent No.: US 8,874,615 B2
(45) Date of Patent: Oct. 28, 2014

(54) METHOD AND APPARATUS FOR IMPLEMENTING A LEARNING MODEL FOR FACILITATING ANSWERING A QUERY ON A DATABASE

(75) Inventor: Armand Erik Prieditis, Mountain View, CA (US)

(73) Assignee: Quova, Inc., Mountain View, CA (US)

( * ) Notice: Subject to any disclaimer, the term of this patent is extended or adjusted under 35 U.S.C. 154(b) by 293 days.

(21) Appl. No.: 13/349,987

(22) Filed: Jan. 13, 2012

(65) Prior Publication Data

US 2013/0185335 A1   Jul. 18, 2013

(51) Int. Cl.
*G06F 17/30* (2006.01)

(52) U.S. Cl.
USPC ........... 707/793; 707/791; 707/797; 707/802; 707/803

(58) Field of Classification Search
CPC .......... G06F 17/2818; G06F 17/30424; G06F 21/6218; G06F 17/30
USPC .......................... 707/793, 791, 797, 802, 803
See application file for complete search history.

(56) References Cited

U.S. PATENT DOCUMENTS

| | | | | |
|---|---|---|---|---|
| 7,451,065 B2 * | 11/2008 | Pednault et al. | ................... | 703/2 |
| 7,698,125 B2 * | 4/2010 | Graehl et al. | ....................... | 704/5 |
| 7,933,915 B2 * | 4/2011 | Singh et al. | .................... | 707/760 |
| 8,170,941 B1 * | 5/2012 | Rachev et al. | .............. | 705/36 R |
| 8,175,985 B2 * | 5/2012 | Sayfan et al. | .................... | 706/12 |
| 8,290,972 B1 * | 10/2012 | Deshmukh et al. | ........... | 707/758 |
| 8,386,532 B2 * | 2/2013 | Annapragada | ................. | 707/802 |
| 2002/0022956 A1 * | 2/2002 | Ukrainczyk et al. | .............. | 704/9 |
| 2002/0130907 A1 * | 9/2002 | Chi et al. | ....................... | 345/853 |
| 2006/0200333 A1 * | 9/2006 | Dalal et al. | ....................... | 703/17 |
| 2007/0143253 A1 * | 6/2007 | Kostamaa et al. | ................ | 707/2 |
| 2008/0177679 A1 * | 7/2008 | Cox et al. | ........................ | 706/11 |
| 2008/0208652 A1 * | 8/2008 | Srivastava | ........................ | 705/7 |
| 2010/0070398 A1 * | 3/2010 | Posthuma et al. | .............. | 705/35 |
| 2010/0094800 A1 * | 4/2010 | Sharp | .............................. | 706/55 |
| 2010/0322472 A1 * | 12/2010 | Hamalainen | .................. | 382/103 |
| 2012/0069003 A1 * | 3/2012 | Birkbeck et al. | .............. | 345/419 |
| 2012/0269407 A1 * | 10/2012 | Criminisi et al. | ............. | 382/128 |

OTHER PUBLICATIONS

Muja, Marius, et al., "Fast Approximate Nearest Neighbors With Automatic Algorithm Configuration", International Conference on Computer Vision Theory and Applications (VISAPP'09), (2009), 10 pgs.

* cited by examiner

*Primary Examiner* — Thanh-Ha Dang
(74) *Attorney, Agent, or Firm* — Schwegman Lundberg & Woessner, P.A.

(57) ABSTRACT

A method and apparatus for implementing a learning model for facilitating answering a query on a database. Example embodiments include processing logic to: receive access to a database having a plurality of rows; determine for each row in the plurality of rows which of a plurality of child nodes to associate with a row based on the row and current parameters, where the current parameters correspond to parameters of a probability distribution for the plurality of child nodes; determine new parameters for the plurality of child nodes based on associated rows of the plurality of rows; determine whether or not to return a result which indicates the new parameters based on the current parameters, the new parameters, and the plurality of rows; and return a result which indicates the new parameters.

20 Claims, 8 Drawing Sheets

METHOD AND APPARATUS FOR IMPLEMENTING A LEARNING MODEL FOR FACILITATING ANSWERING A QUERY ON A DATABASE

TECHNICAL FIELD

Various embodiments illustrated by way of example relate generally to the field of data processing and, more specifically, to a method and apparatus for implementing a learning model for facilitating answering a query on a database.

BACKGROUND

Previous approaches to learning a model involve space-partitioning the database so that it can subsequently be searched faster for answering a query. Space-partitioning methods including kd-trees, metric trees, M-trees, R*-trees, vp-trees, vantage point trees, vantage point forests, multi-vantage point trees, bisector trees, Orchard's algorithm, random projections, fixed queries trees, Voronoi trees, BBD-trees, min-wise independent permutations, Burkhard-Keller trees, generalized hyper-plane trees, geometric near-neighbor access trees (GNAT), and spatial approximation trees (SAT). Unfortunately, space partitioning does not scale up as the number of dimensions (i.e., columns) grows. This is because the number of partitions per node is typically $2^n$ where n is the number of dimensions. Another problem with space-partitioning methods is that they require sorting the database, which can be time-consuming with large databases. Finally, space-partitioning methods cannot handle missing data nor can they extrapolate beyond or interpolate between rows in the database.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
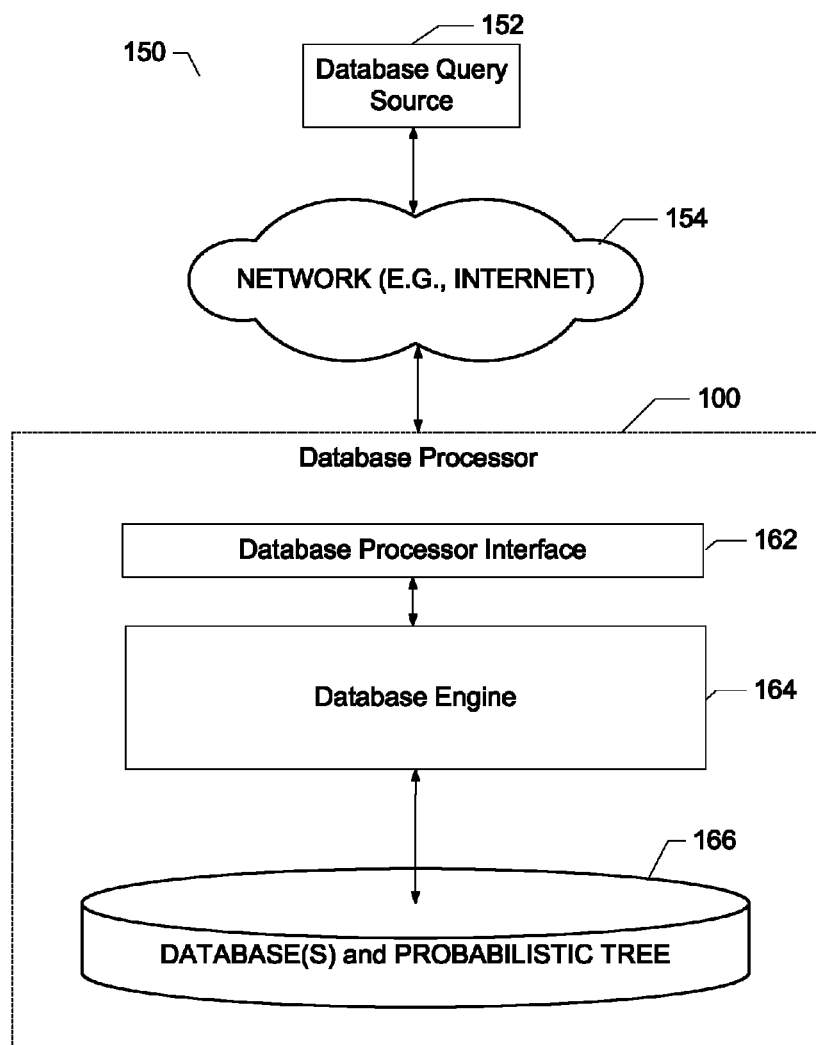
FIG. 1 illustrates a network diagram depicting a system having a database query source in network communication with a database processor and a database via a data network, according to an example embodiment.

According to an example embodiment, a method and apparatus for implementing a learning model for facilitating answering a query on a database is described. Other features will be apparent from the accompanying drawings and from the detailed description that follows. In the following description, for purposes of explanation, numerous specific details are set forth in order to provide a thorough understanding of embodiments. It will be evident, however, to one of ordinary skill in the art that the present description may be practiced without these specific details.

Overview

According to various example embodiments described herein, the disclosed system and method solves the problem of implementing a learning model for facilitating answering a query on a database. The database can comprise one or more rows of information, where each row can be a vector, a matrix, or any other data structure. The query can correspond to a set of input variable values and a non-empty set of output variables of interest. Answering a query involves finding a set of rows that "match" the input variable values and returning the output variable values for each such "matching" row. The term "match" is used loosely here to mean both an exact match and an approximate or nearest match. The model comprises one or more parameters which characterize the database. Answering a query is important because it is a central operation on a database. For example, query answering arises in a variety of contexts, including content-based image retrieval, DNA sequencing, traceroute analysis, data compression, recommendation systems, internet marketing, classification and prediction, cluster analysis, plagiarism detection, and the like. In content-based image retrieval, the query might correspond to a particular set of red, green, and blue pixel values of a desired image. When the database contains billions of images, each with millions of pixels, answering such a query can be difficult and a learned model with certain properties can make answering the query more efficient.

The various example embodiments described herein solve the problem of implementing a learning model for facilitating answering a query on a database by using hierarchical probabilistic decomposition. One embodiment involves a system which determines new parameters for two or more child nodes of a parent node based on current parameters associated with the child nodes and two or more rows associated with the parent node. First, the system determines for each row in the two or more rows which one of the two or more child nodes with which to associate that row based on the row and the current parameters, where the current parameters correspond to the parameters of a probability distribution for the two or more child nodes. For example, the system can infer a most likely child node with which to associate each row based on the probability distribution. Next, the system determines the new parameters for the two or more child nodes based on the associated rows. Subsequently, the system determines whether or not to return a result which indicates the new parameters based on the current parameters, the new parameters, and the two or more rows. If so, the system returns a result which indicates the new parameters. If not, the system sets the current parameters to the new parameters.

Note that the system can also infer missing values in each row after associating each row with the one of the two or more child nodes. Once the row is associated with a particular child node, the system can infer the missing values from the known values based on the parameters associated with the child node. For example, the system can infer a most likely value for each missing value based on a probability distribution associated with the node.

Note also that the system can determine new parameters based on any current parameters. Typically, the system randomly chooses initial parameters and completes hundreds of updates with the current parameters set to the new parameters each time, as described above.

Once the system produces that result, each row of the two or more rows associated with the parent node can be assigned to a child node based on the new parameters and the row and the process can repeat with the rows assigned to each child node. For example, each row can be assigned to a child node which is most likely given the new parameters and the row, where likelihood is defined relative to the probability distribution function. The process of determining new parameters and assigning nodes to a child node can be repeated after assignment to each child node, thus producing a probabilistic tree with relationships between the parent node and its two or more children. Various methods can be used to identify the relationship between a parent and a child. For example, the system can index each node in a binary tree with a unique integer i where the left child can be indexed by 2i+1 and the right child by 2i+2. Indexing is important because the parameters at each node may be required to be retrieved quickly during subsequent query answering. Moreover, other information (e.g., a lower bound) may be associated with each node and an index can facilitate efficient retrieval of that lower bound.

The process of building the probabilistic tree can be terminated under various criteria, which depends on the particular application. For example, in some applications it can be desirable to terminate the process when a child node contains only a single row. In other applications, such termination might result in "overfitting" the data. In this case, more desirable termination criteria might involve determining whether or not the tree "overfits" the data. For example, a train-and-test likelihood can be computed before and after determining the parameters of the child nodes. If the train-and-test likelihood is worst after the split (i.e., the child nodes "overfit" the data), the process can be terminated.

Once the probabilistic tree is built, various methods can be used to answer queries on that tree, which makes answering queries more efficient.

As described herein for various embodiments, the following advantages and benefits can be realized:
1. Various embodiments can scale up as the number of dimensions increases (i.e., the number of children for each node is not a function of the number of dimensions).
2. Various embodiments can scale up as the number of rows increases (i.e., the embodiments do not require sorting).
3. Various embodiments produce beneficial results not provided in previous approaches.

The system of various embodiments can be used to implement a learning model for facilitating answering a query on a geographic database. For example, the system can be used to answer queries involving geo-location, which may involve databases that are terabyte-sized. Additionally, various embodiments can be offered as a service, which also includes automatically building a probabilistic tree based on a provided database, securely hosting that probabilistic tree, and providing an efficient means for answering queries as described herein.

An example embodiment involves using a multivariate normal distribution at a node, which is characterized by a mean vector and a covariance matrix. Other example embodiment involve nodes with two children, a lower-bound function based on the minimum sum of the path cost to each leaf node, a lower-bound function based on the mean, and the minimum (min), and maximum (max) values for each input variable at a node. Non-probabilistic trees could be used, but they don't scale up in terms of the number of columns of input. Other uses include content-based image retrieval, DNA sequencing, traceroute analysis, data compression, recommendation systems, internet marketing, classification and prediction, cluster analysis, plagiarism detection, and the like. In content-based image retrieval, the query might correspond to a particular set of red, green, and blue pixel values of a desired image. When the database contains billions of images, each with millions of pixels, answering such a query can be difficult without the benefits of the various embodiments described herein.

Detailed Description of an Example Embodiment

FIG. 1 illustrates a network diagram depicting a system 150 having a database query source 152 in network communication with a database processor 100 and a database 166 via a data network 154, according to an example embodiment. Database query source 152 represents any computing entity, which may originate a query on a database, such as database 166. Database query source 152 can include a client system, a server system, an automated service, an autonomous network, or the like. Database query source 152 can also be a computing entity that is directly connected to the database processor 100 and/or database 166 without the use of a data network.

The database 166 can be any conventional type of data repository. Additionally, as described herein, the database 166 can be configured to include a probabilistic tree. The probabilistic tree can comprise a set of nodes, where each node is associated with a probability distribution function corresponding to one or more rows in the database. For example, the probability distribution function might be a multivariate normal, comprising a mean vector and a covariance matrix. The mean vector represents typical values for a row and the covariance matrix represents deviation associated with pairs of those typical values. Other distributions might have different parameters. Each node can have zero or more children and is also associated with a probability of the node given the parent node. Each node can also have an identifier associated with it, which facilitates retrieval of that associated information. The probabilistic tree for various embodiments can be built using various methods as described herein. As described in more detail herein, various embodiments, implemented by the processing performed by the database processor 100, provide a method and apparatus for implementing a learning model for facilitating answering a query on a database, such as database 166.

Figure 2:
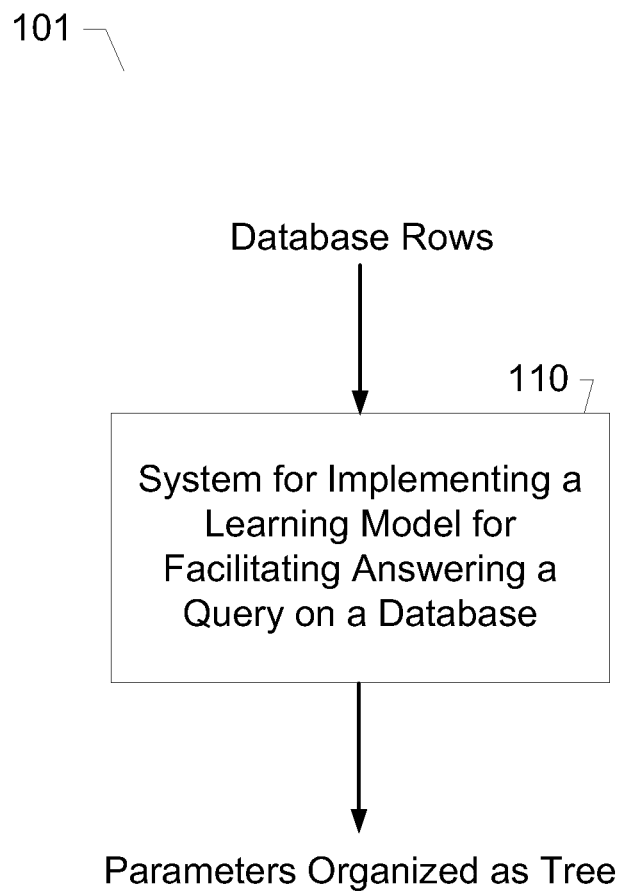
FIG. 2 illustrates an overall view of the processing performed by an example embodiment.

Referring now to FIG. 2, an overall view 101 illustrates the processing performed by an example embodiment. In an example embodiment as shown in FIG. 2, the System for Implementing a Learning Model for Facilitating Answering a Query on a Database 110 receives a set of database rows as an input from a database 166. Using the techniques described herein, the System 110 processes the database rows and produces a probabilistic tree comprising a set of nodes arranged as parameters organized in a tree. A database query processor can use the probabilistic tree to answer a query on the database 166.

The overall view 101 shown in FIG. 2 illustrates one way in which an embodiment can be used, which is to process one or more rows in a database and to build a tree of parameters. The parameters at each node can be viewed as a model. For example, a multivariate normal model comprises a mean vector and a covariance matrix. The mean vector might represent the averages associated with the data at the node and the covariance might represent the deviation associated with pairs of those mean values.

Figure 3:
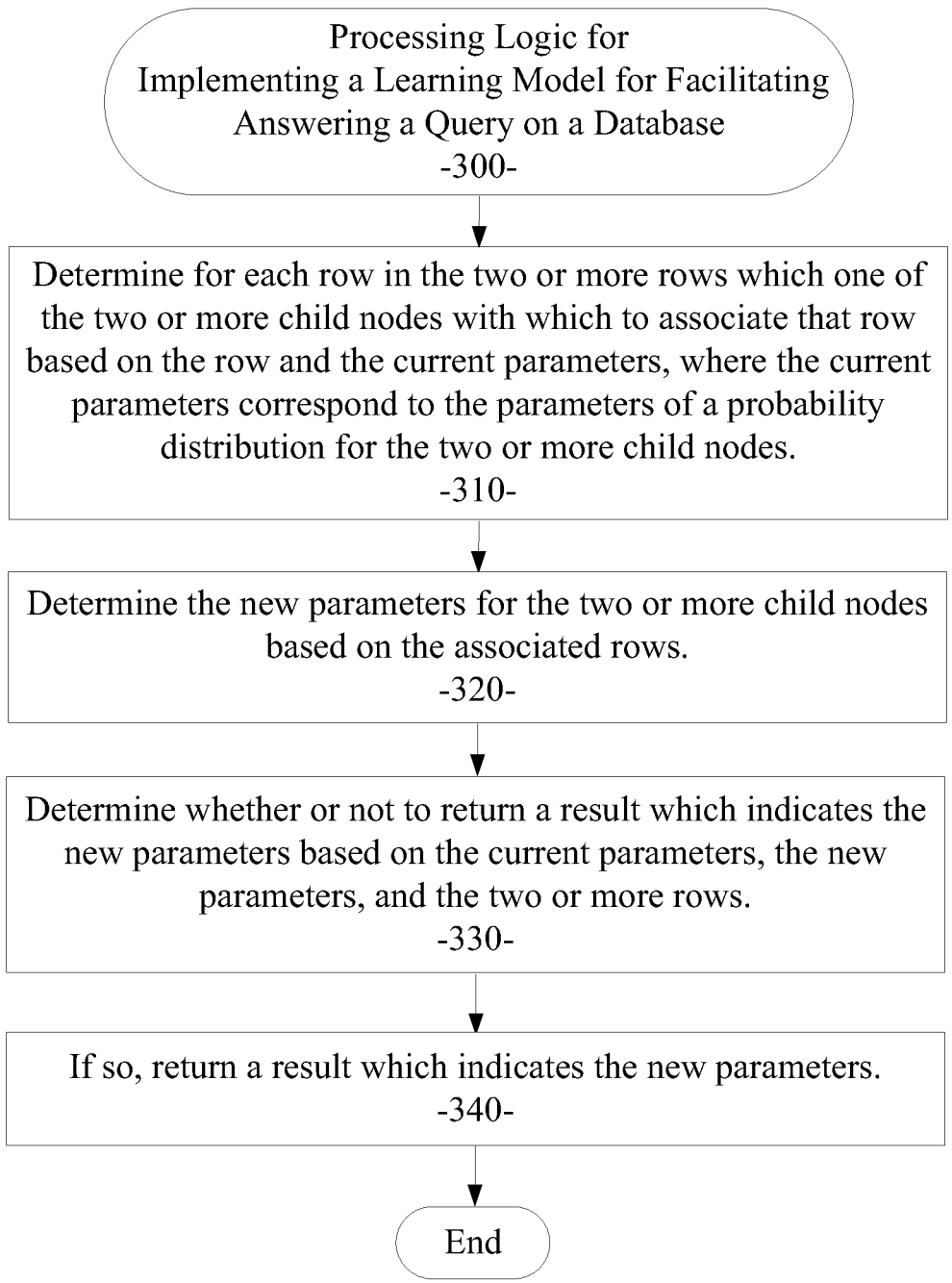
FIG. 3 illustrates a flowchart of an overall view of the processing performed by an example embodiment.

FIG. 3 illustrates a flowchart of an overall view of the processing performed by an example embodiment. In the example embodiment, processing logic 300 for implementing a learning model for facilitating answering a query on a database includes processing logic to: determine for each row in the two or more rows which one of the two or more child nodes with which to associate that row based on the row and the current parameters, where the current parameters correspond to the parameters of a probability distribution for the two or more child nodes (processing block 310); determine the new parameters for the two or more child nodes based on the associated rows (processing block 320); determine whether or not to return a result which indicates the new parameters based on the current parameters, the new parameters, and the two or more rows (processing block 330); and if so, return a result which indicates the new parameters (processing block 340).

Figure 4:
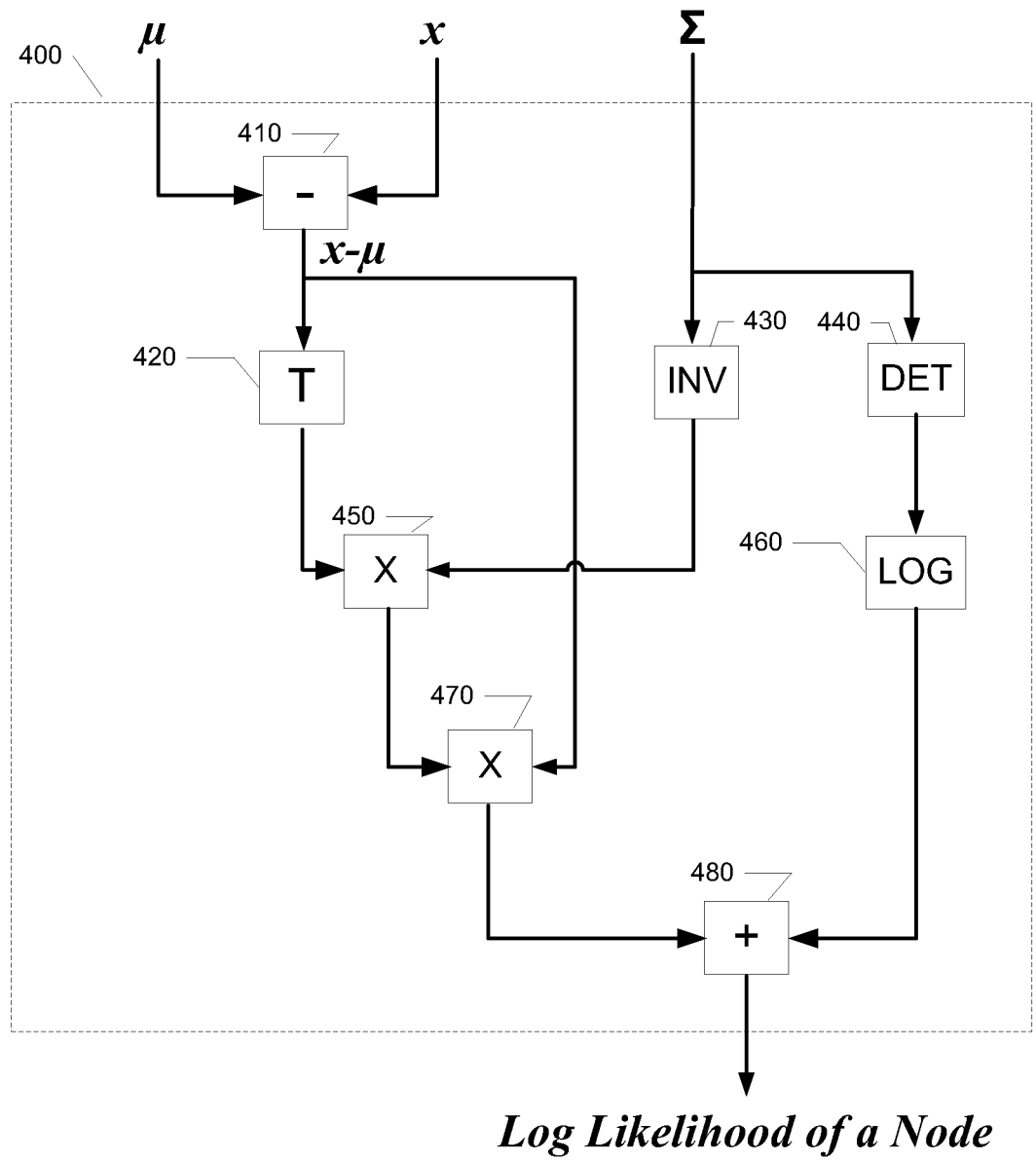
FIG. 4 illustrates an example embodiment of the processing used by the database processor for determining the log likelihood of a node for a particular row x in the input data at a node.

FIG. 4 illustrates an example embodiment of the processing used by the database processor 110 for determining the log likelihood of a node for a particular row x in the input data at a node. As shown in FIG. 4, database row x is an n by 1 vector comprising the n non-missing values at a row in the input data. As shown in FIG. 4, the symbol μ represents a current mean vector (also n by 1 in dimension) associated with the non-missing values for the row. As shown in FIG. 4, the symbol □ represents the current covariance matrix (which is n by n in dimension) for the non-missing values for that row. The term x−μ (shown in FIG. 4 as the output of subtractor 410) represents the deviation, which gets transposed (block 420) and multiplied (block 450) by the inverse of □ (block 430). This quantity (shown in FIG. 4 as the output of multiplier 450) then gets multiplied (block 470) by the deviation x−μ and finally added (block 480) to the log-determinant of □ (blocks 440 and 460). Note that each node has its own μ (mean) and □ (covariance), a part of which is used to determine the log likelihood of a node for a particular row x. The log likelihood of a node is produced as an output of the processing module 400 shown in FIG. 4. This expression corresponds to the likelihood of a particular row x given the parameters μ and □ for a node. However, in the embodiment shown, the log form is used to simplify calculations. Other mathematically equivalent forms can also be used. In addition, □ can be presented in a simplified form (e.g., as a diagonal matrix with zeros off the diagonal). In this simplified form, the inverse is simply the inverse of each of the diagonal entries and the log determinant is simply the sum of the logs of the diagonal entries.

Figure 5:
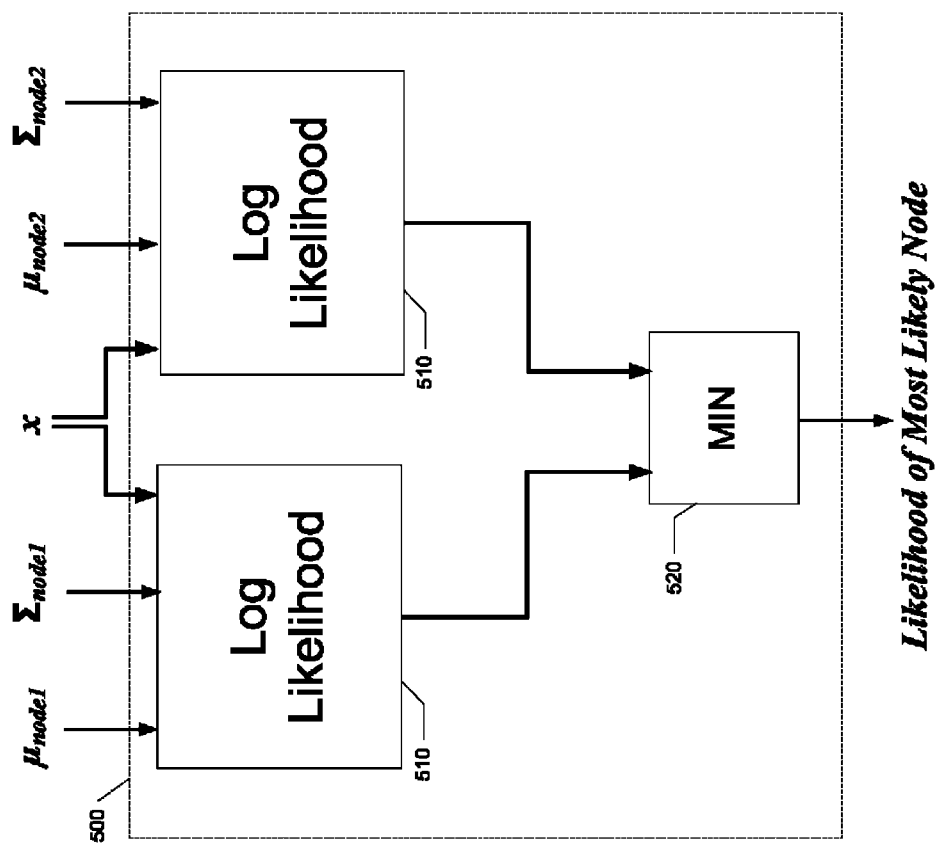
FIG. 5 illustrates an example embodiment of the processing used by the database processor for determining a most likely node.

FIG. 5 illustrates an example embodiment of the processing used by the database processor 110 for determining a most likely node. For simplicity, the embodiment illustrated in FIG. 5 assumes only two nodes (node1 and node2) are being compared. Although the embodiment illustrated in FIG. 5 shows only the likelihood of the most likely node being returned by processing module 500, the actual value of interest is the node associated with the most likely value, rather than the most likely value itself. This information can simply be associated with the most likely value when it is returned by the processing module 500.

As illustrated in FIG. 5, □ and μ are shown to be associated with two particular nodes (labeled node1 and node2). These values are provided as inputs to the processing module 500 of the example embodiment. In this manner, each node has □ and a μ associated with it. For example, if node 1 returns 0.6 for a particular row x and □ and μ for that node and node 2 returns 4.5 for the same row x and the □ and μ associated with node 2, then node 1 is associated with the lowest value (0.6). Note that the system of various embodiments is not limited to two nodes when determining a most likely node for a given x and parameters □ and μ. A similar apparatus can be used to determine a most likely node with n nodes, where the inputs are simply the □ and μ for each node and the minimum (block 520) log likelihood (block 510) for each node is over the log likelihood for each node's □, μ, and the given input x.

In the example embodiment shown in FIG. 5, the log likelihood function is mathematically expressed as the negative of the log of a multivariate normal distribution defined by □ and μ, with the constants removed for simplification of the expression without loss of generality. The general form can be expressed as follows:

$$-\log(p(x)) \approx \log(\det(\Sigma)) + (x-\mu)^T \Sigma^{-1}(x-\mu)$$

Figure 6:
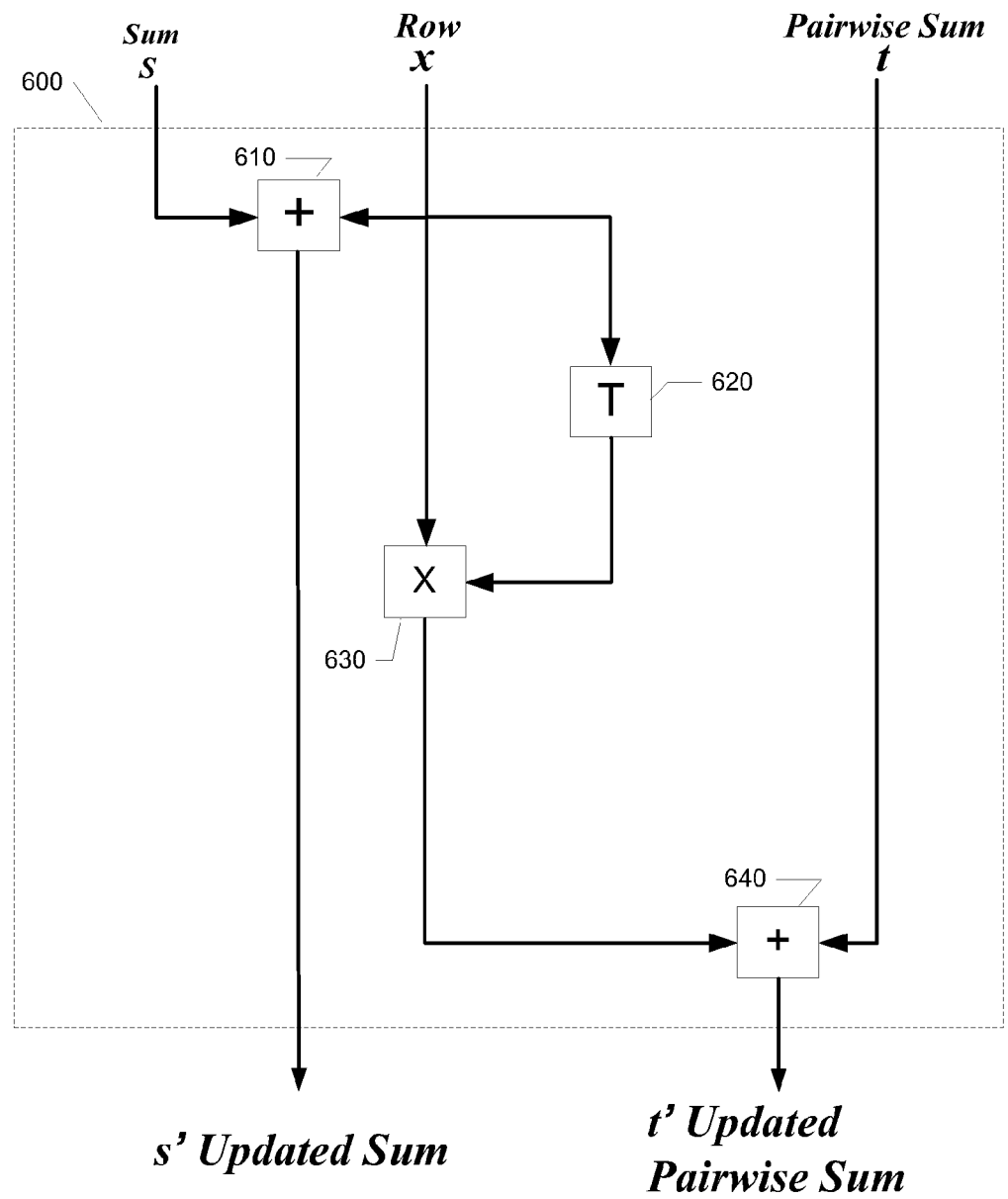
FIG. 6 illustrates an example update apparatus in an example embodiment.

FIG. 6 illustrates an example update apparatus in an example embodiment. In the example embodiment shown, the current parameters (for a particular node) comprise a sum s, which corresponds to an n by 1 vector of the column sums, x, which corresponds to an n by 1 vector of a particular row, and t which corresponds to an n by n matrix of product sums of a pair of columns. Here, x corresponds to the entire row (not just the non-missing values) and n corresponds to the number of columns. The processing module 600, of the example embodiment shown in FIG. 6, produces an updated sum s' and an updated pairwise sum t' as it processes each row x.

Note that the apparatus in FIG. 5 determines a most likely node for a row and this updates the parameters for that node based on the current parameters and the row. Missing values can be filled in using various inference procedures between the output of FIG. 5 and the input of FIG. 6. Typically, the sum s and product sum t are initialized to 0 prior to processing a set of rows and repeatedly updating the sum s and the product sum t. Once the sum and product sum are determined for a set of rows, the mean μ and a covariance matrix can be determined. The mean μ can be determined from the sum S divided by the number of rows. Similarly, the covariance of columns i and j can be determined from product sum t for columns i and j divided by the number of rows.

Figure 7:
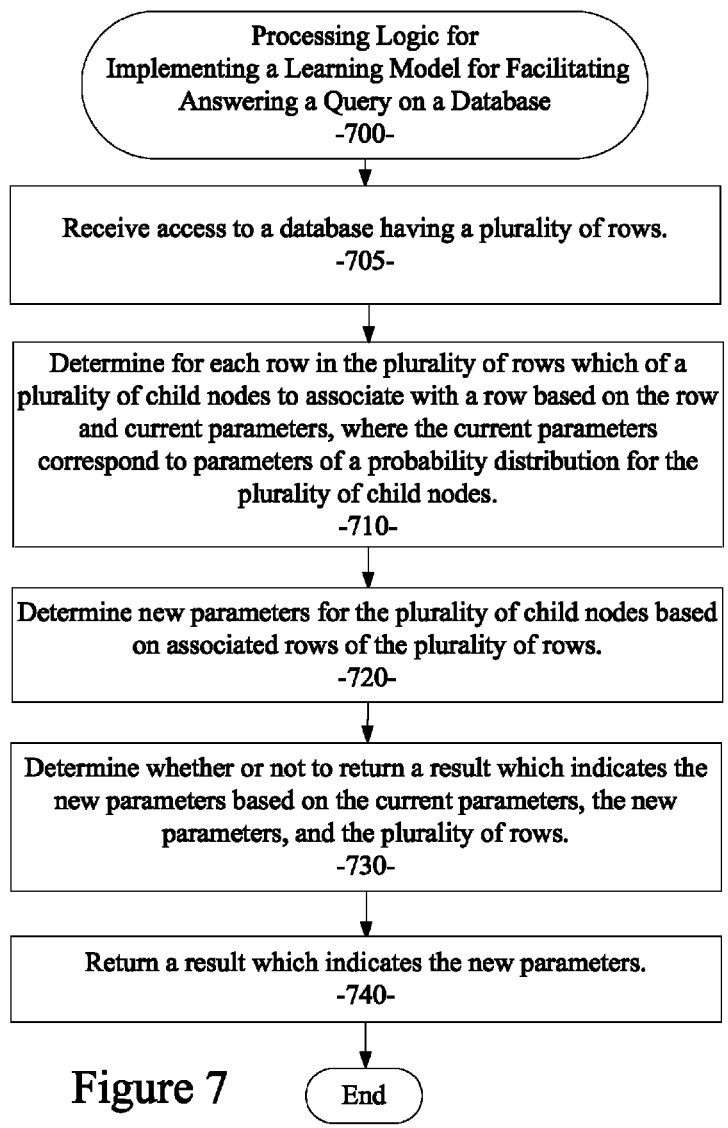
FIG. 7 illustrates a processing flow used in an example embodiment.

FIG. 7 illustrates a flowchart showing the processing flow for a method and apparatus for implementing a learning model for facilitating answering a query on a database in an example embodiment. Example embodiments include processing logic to: receive access to a database having a plurality of rows (processing block 705); determine for each row in the plurality of rows which of a plurality of child nodes to associate with a row based on the row and current parameters, where the current parameters correspond to parameters of a probability distribution for the plurality of child nodes (processing block 710); determine new parameters for the plurality of child nodes based on associated rows of the plurality of rows (processing block 720); determine whether or not to return a result which indicates the new parameters based on the current parameters, the new parameters, and the plurality of rows (processing block 730); and return a result which indicates the new parameters (processing block 740).

Figure 8:
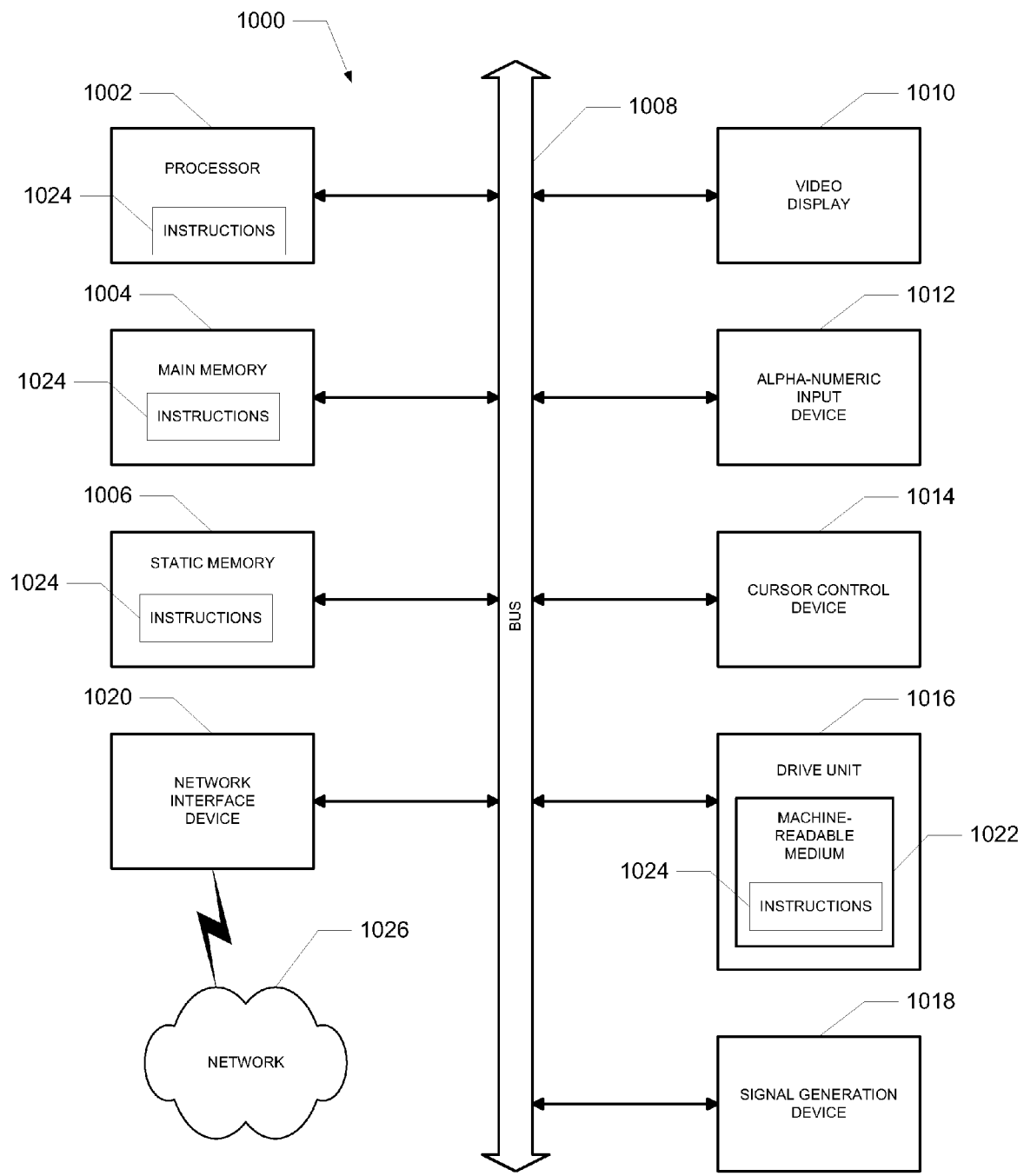
FIG. 8 shows a diagrammatic representation of a machine in the example form of a computer system.

FIG. 8 shows a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media. The instructions 1024 may further be transmitted or received over a network 1026 via the network interface device 1020.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a computer system (e.g., a standalone, client or server computer system) configured by an application may constitute a "module" that is configured and operates to perform certain operations as described herein below. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical media, and magnetic media.

As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, a method and apparatus for implementing a learning model for facilitating answering a query on a database have been described. Although embodiments have been described with reference to specific example embodiments, it will be evident that various modifications and changes may be made to these embodiments without departing from the broader spirit and scope of embodiments as expressed in the subjoined claims.

What is claimed is:

1. A method comprising:
receiving access to a database having a plurality of rows;
determining, by use of a processor, for each row in the plurality of rows that is associated with a selected parent node, which of a plurality of child nodes to associate with a selected row of the plurality of rows based on the row and current parameters, where the current parameters correspond to parameters of a multivariate normal distribution of a multivariate normal model for the plurality of child nodes, the multivariate normal model comprising a mean vector and a covariance matrix, the mean vector comprising one or more mean values of data of a corresponding node and the covariance matrix comprising a deviation value for each of a plurality of pairs of the mean values;

associating each row in the plurality of rows that is associated with the selected parent node with the corresponding determined child node;

determining new parameters for the plurality of child nodes based on associated rows of the plurality of rows;

determining whether or not to return a result which indicates the new parameters based on the current parameters, the new parameters, and the plurality of rows; and returning a result which indicates the new parameters.

2. The method of claim 1 wherein the plurality of rows are vectors or matrices.

3. The method of claim 1 wherein the current parameters correspond to parameters of a multivariate normal distribution for the plurality of child nodes.

4. The method of claim 1 including setting the current parameters to the new parameters.

5. The method of claim 1 including inferring missing values in each row of the plurality of rows after associating each row with the plurality of child nodes.

6. The method of claim 1 including determining the new parameters based on the current parameters.

7. The method of claim 1 including producing a probabilistic tree with relationships between a parent node and the plurality of child nodes.

8. The method of claim 7 including terminating the production of the probabilistic tree when termination criteria are satisfied.

9. A system comprising:
a processor; and
a database processor, in data communication with the processor, to:
receive access to a database having a plurality of rows;
determine for each row in the plurality of rows that is associated with a selected parent node, which of a plurality of child nodes to associate with a selected row of the plurality of rows based on the row and current parameters, where the current parameters correspond to parameters of a multivariate normal distribution of a multivariate normal model for the plurality of child nodes, the multivariate normal model comprising a mean vector and a covariance matrix, the mean vector comprising one or more mean values of data of a corresponding node and the covariance matrix comprising a deviation value for each of a plurality of pairs of the mean values;
associate each row in the plurality of rows that is associated with the selected parent node with the corresponding determined child node;
determine new parameters for the plurality of child nodes based on associated rows of the plurality of rows;
determine whether or not to return a result which indicates the new parameters based on the current parameters, the new parameters, and the plurality of rows; and
return a result which indicates the new parameters.

10. The system of claim 9 wherein the plurality of rows are vectors or matrices.

11. The system of claim 9 wherein the current parameters correspond to parameters of a multivariate normal distribution for the plurality of child nodes.

12. The system of claim 9 being further configured to set the current parameters to the new parameters.

13. The system of claim 9 being further configured to infer missing values in each row of the plurality of rows after associating each row with the plurality of child nodes.

14. The system of claim 9 being further configured to determine the new parameters based on the current parameters.

15. The system of claim 9 being further configured to produce a probabilistic tree with relationships between a parent node and the plurality of child nodes.

16. The system of claim 15 being further configured to terminate the production of the probabilistic tree when termination criteria are satisfied.

17. An article of manufacture comprising a non-transitory machine-readable storage medium having machine executable instructions embedded thereon, which when executed by a machine, cause the machine to:
receive access to a database having a plurality of rows;
determine for each row in the plurality of rows that is associated with a selected parent node, which of a plurality of child nodes to associate with a selected row of the plurality of rows based on the row and current parameters, where the current parameters correspond to parameters of a multivariate normal distribution of a multivariate normal model for the plurality of child nodes, the multivariate normal model comprising a mean vector and a covariance matrix, the mean vector comprising one or more mean values of data of a corresponding node and the covariance matrix comprising a deviation value for each of a plurality of pairs of the mean values;
associate each row in the plurality of rows that is associated with the selected parent node with the corresponding determined child node;
determine new parameters for the plurality of child nodes based on associated rows of the plurality of rows;
determine whether or not to return a result which indicates the new parameters based on the current parameters, the new parameters, and the plurality of rows; and
return a result which indicates the new parameters.

18. The article of manufacture of claim 17 wherein the plurality of rows are vectors or matrices.

19. The article of manufacture of claim 17 wherein the current parameters correspond to parameters of a multivariate normal distribution for the plurality of child nodes.

20. The article of manufacture of claim 17 being further configured to infer missing values in each row of the plurality of rows after associating each row with the plurality of child nodes.

* * * * *